(12) United States Patent
Tawata

(10) Patent No.: US 11,491,788 B2
(45) Date of Patent: Nov. 8, 2022

(54) INK-JET COATER AND COATING METHOD

(71) Applicant: ABB Schweiz AG, Baden (CH)

(72) Inventor: Takahiro Tawata, Tokyo (JP)

(73) Assignee: ABB SCHWEIZ AG, Baden (CH)

(*) Notice: Subject to any disclaimer, the term of this patent is extended or adjusted under 35 U.S.C. 154(b) by 309 days.

(21) Appl. No.: 16/800,339

(22) Filed: Feb. 25, 2020

(65) Prior Publication Data

US 2020/0406617 A1 Dec. 31, 2020

Related U.S. Application Data

(63) Continuation of application No. PCT/JP2019/025448, filed on Jun. 26, 2019.

(51) Int. Cl.
| | |
|---|---|
| *B41J 2/145* | (2006.01) |
| *B25J 11/00* | (2006.01) |
| *B05B 1/14* | (2006.01) |
| *B05B 13/04* | (2006.01) |
| *B41J 3/407* | (2006.01) |

(52) U.S. Cl.
CPC ............ *B41J 2/145* (2013.01); *B05B 1/14* (2013.01); *B05B 13/0431* (2013.01); *B25J 11/0075* (2013.01); *B41J 3/4073* (2013.01)

(58) Field of Classification Search
CPC ........ B41J 2/145; B41J 3/4073; B41J 2/2114; B41J 2002/14225; B41J 2002/14379; B41J 2/14209; B41J 2202/20; B05B 1/14; B05B 13/0431; B05B 17/0607; B05B 17/0661; B05B 12/084; B25J 11/0075
See application file for complete search history.

(56) References Cited

U.S. PATENT DOCUMENTS

| | | |
|---|---|---|
| 9,592,524 B2 | 3/2017 | Fritz et al. |
| 2005/0157104 A1 | 7/2005 | Hirota et al. |
| (Continued) | | |

FOREIGN PATENT DOCUMENTS

| | | |
|---|---|---|
| CN | 1448267 A | 10/2003 |
| CN | 1626347 A | 6/2005 |
| (Continued) | | |

OTHER PUBLICATIONS

China National Intellectual Property Administration, Rejection Decision issued in corresponding Application No. 2018800643695, dated Mar. 29, 2021, 11 pp.

(Continued)

*Primary Examiner* — Bradley W Thies
(74) *Attorney, Agent, or Firm* — Greenberg Traurig, LLP

(57) ABSTRACT

An ink-jet coater and a coating method for improving smoothness of a mixed part where the coating position in the previous scan overlaps the coating position in the next scan includes a robot arm configured to move a nozzle head unit by driving arms via an arm driving mechanism and a coating control unit configured to control driving of the nozzle driving mechanism and driving of the arm driving mechanism to execute coating on the coating object. The coating control unit performs coating by forming, in segmented coating surfaces formed by each scanning of the nozzle head unit, a normal coating region coated with a target coating film thickness and an overlapping coating region coated with a spray amount of the paint less than the normal coating region.

9 Claims, 14 Drawing Sheets

(56) References Cited

U.S. PATENT DOCUMENTS

2014/0132670 A1    5/2014   Ikeda et al.
2016/0355026 A1*  12/2016  Mathis ..................... B41J 2/01
2019/0091712 A1    3/2019   Medard et al.

FOREIGN PATENT DOCUMENTS

| | | |
|---|---|---|
| CN | 1905952 A | 1/2007 |
| CN | 101003041 A | 7/2007 |
| CN | 101022893 A | 8/2007 |
| CN | 101269574 A | 9/2008 |
| CN | 101746709 A | 6/2010 |
| CN | 104907227 A | 9/2015 |
| CN | 106183511 A | 12/2016 |
| CN | 106915160 A | 7/2017 |
| CN | 107636225 A | 1/2018 |
| CN | 108141938 A | 6/2018 |
| DE | 102017101336 A1 | 7/2018 |
| EP | 2208541 A2 | 7/2010 |
| FR | 3087704 A1 | 5/2020 |
| JP | H11123817 A | 5/1999 |
| JP | H11245384 A | 9/1999 |
| JP | 2012101146 A | 5/2012 |
| JP | 2013-530816 A | 8/2013 |
| JP | 2016221958 A | 12/2016 |
| JP | 2017069199 A | 4/2017 |
| JP | 2017192932 A | 10/2017 |
| JP | 2018122225 A | 8/2018 |
| JP | 2019077046 A | 5/2019 |
| JP | 2019080278 A | 5/2019 |
| TW | 201914698 A | 4/2019 |
| WO | 2011138048 A1 | 11/2011 |
| WO | 2019017214 A1 | 1/2019 |

OTHER PUBLICATIONS

European Patent Office, Extended Search Report issued in corresponding Application No. 19850781.6, dated Mar. 25, 2021, 10 pp.
Japanese Patent Office, First Office Action issued in corresponding Japanese application No. 2020-511832, dated Jun. 11, 2020, 8 pp.
Japanese Patent Office, International Search Report & Written Opinion issued in corresponding Application No. PCT/JP2019/025448, dated Sep. 3, 2019, 10 pp.
Office Action issued for CN Application No. 201980004094.0 dated Sep. 28, 2021.
China Second Office Action, issued by (SIPO) China National Intellectual Property Administration, regarding corresponding patent application Serial No. CN 201980004094.0; dated Jan. 25, 2022; 19 pages (with English translation).
China Third Office Action, issued by (SIPO) China National Intellectual Property Administration, regarding corresponding patent application Serial No. CN 201980004094.0; dated Apr. 14, 2022; 12 pages (with English Translation).
Japan—Decision of Pretrial Reexamination, issued by the Japanese Patent Office, regarding corresponding patent application Serial No. 2020-511832 [JP Appeal Trial No. 2021-002290], dated Jun. 11, 2021; 6 pages with translation.
Supplementary Search, issued by the China National Intellectual Property Administration; regarding corresponding patent application Serial No. CN 201980004094O; dated Jul. 26, 2022; 1 page.
Japan Notification of Reasons for Refusal; issued by the Japanese Patent Office; regarding corresponding patent application Serial No. JP 2020-511832; dated Sep. 20, 2022 (38 pages/31 pages English Translation).

* cited by examiner

|   |   |   |
|---|---|---|
| 2 | 0 | 5 |
| 6 | 3 | 1 |
| 2 | 4 | 3 |

Fig. 10

|   |   |   |
|---|---|---|
| 6 | 6 | 7 |
| 7 | 7 | 6 |
| 7 | 5 | 7 |

Fig. 11

INK-JET COATER AND COATING METHOD

FIELD

The present invention relates to a coater and a coating method.

BACKGROUND

In recent years, in coating production lines for vehicles such as automobiles, it has been proposed to coat the vehicles with a coater in an ink-jet fashion, as mentioned in Patent Literature 1. The Patent Literature 1 discloses coating the vehicles by spraying ink from respective nozzles of a nozzle column in a nozzle head.

PRIOR LITERATURE

Patent Literature

Patent Literature 1: JP patent gazette No. 5976320

SUMMARY

However, the nozzle for spraying ink usually has a width much shorter than the vehicle. Accordingly, in coating the vehicle, it is necessary to gradually change the position of the nozzle head relative to the vehicle and repeatedly scan with the nozzle head simultaneously. In this case, the following issues appear. An end side of the coating region in a previous scan tends to overlap with the coating region in a new scan and this overlapping situation causes differences in the thickness of the coating film formed. This is the main reason that the thickness of the coating film at the overlapping position is different from that at other positions, which degrades the coating quality.

The present invention is completed based on the above situation and intended to a provide a coater and a coating method for enhancing the coating quality by improving smoothness of a mixed part where the coating position in the previous scan overlaps with the coating position in the next scan.

To address the above issue, there is provided a coater in accordance with a first aspect of the present invention. The coater coats a coating object by spraying paint from a nozzle in an ink-jet fashion, wherein the coater comprises: a nozzle head unit having a nozzle head formed with a plurality of nozzles at a nozzle spray surface and a nozzle driving mechanism causing the paint to be sprayed from the nozzles; a robot arm having a plurality of arms capable of relatively rotating via shafts and an arm driving mechanism for moving the arms, and configured to move the nozzle head unit in a state of holding the nozzle head unit through driving of the arm driving mechanism; and a coating control unit configured to control driving of the nozzle driving mechanism and driving of the arm driving mechanism to execute coating on the coating object; wherein the coating control unit controls the execution of the coating on the coating object by repeating scanning of the nozzle head unit for a plurality of times in a state of being divided into segmented coating surfaces formed by each scanning of the nozzle head unit; and wherein the coating control unit performs the coating by forming a normal coating region and an overlapping coating region in the segmented coating surfaces, wherein the coating is performed in the normal coating region so as to have a target coating film thickness, and the coating is performed in the overlapping coating region in a state where a spray amount of the paint is reduced compared to the normal coating region; and wherein the coating control unit performs a overlapping coating control by mixing the overlapping coating region in the segmented coating surface to be coated in a next scan with the overlapping coating region in the segmented coating surface coated in a previous scan and taking the coating film thickness of the mixed overlapping coating region as the target coating film thickness to perform coating.

In addition, other aspects of the present invention preferably include in the overlapping coating control, the driving of the nozzle driving mechanism and the driving of the arm driving mechanism are controlled to perform coating such that the overlapping coating region of the segmented coating surface to be coated in the next scan overlaps the overlapping coating region of the segmented coating surface coated in the previous scan in a thickness direction, thereby becoming the target coating film thickness.

Other aspects of the present invention preferably also include in the overlapping coating control, the driving of the nozzle driving mechanism is controlled, such that the paint is sprayed from the nozzles in a state where the paint sprayed from the nozzle in the overlapping coating region has a smaller droplet size than the paint sprayed in the normal coating region.

Other aspects of the present invention preferably further include in the overlapping coating control, the driving of the nozzle driving mechanism is controlled, such that the number of the droplets of the paint sprayed per unit area of the coating object in the overlapping coating region is less than that in the normal coating region.

Other aspects of the present invention preferably further include in the overlapping coating control, the coating is controlled by arranging a plurality of subdivided coating regions in the overlapping coating region and by placing the subdivided coating regions in the overlapping coating region formed in the previous scan adjacent to the subdivided coating regions in the overlapping coating region formed in the next scan.

In accordance with a second aspect of the present invention, there is provided a coating method for coating a coating object by spraying paint from a nozzle in an ink-jet fashion, wherein the coating method comprises: a nozzle head unit having a nozzle head formed with a plurality of nozzles at a nozzle spray surface and a nozzle driving mechanism causing the paint to be sprayed from the nozzles; a robot arm having a plurality of arms capable of relatively rotating via shafts and an arm driving mechanism for moving the arms, and configured to move the nozzle head unit in a state of holding the nozzle head unit through driving of the arm driving mechanism; and a coating control unit configured to control driving of the nozzle driving mechanism and driving of the arm driving mechanism to execute coating on the coating object; wherein the coating on the basis of control of the coating control unit includes: a scanning step in which a plurality of the nozzle head units are caused to scan relative to the coating object; and a segmented coating step in which segmented coating surfaces are formed by spraying the paint from the nozzle relative to the coating object during each scanning step; the segmented coating surfaces include a normal coating region coated with a target coating film thickness and an overlapping coating region coated with a spray amount of the paint less than the normal coating region; the paint is sprayed from the nozzles in such a way that the overlapping coating region in the segmented coating surface to be coated in a next segmented coating step is mixed with the overlapping coating region in the segmented coating surface coated in a previous segmented coating step and the coating film thickness of the mixed overlapping coating region becomes the target coating film thickness.

In addition, other aspects of the present invention preferably include in the segmented coating step, the paint is sprayed from the nozzles in such a way that the overlapping coating region of the segmented coating surface to be coated in the next scan overlaps the overlapping coating region of the segmented coating surface coated in the previous scan in a thickness direction to become the target coating film thickness.

Other aspects of the present invention preferably also include in the segmented coating step, the paint is sprayed from the nozzles in a state where the paint sprayed from the nozzle in the overlapping coating region has a smaller droplet size than the paint sprayed in the normal coating region.

Other aspects of the present invention preferably further include in the segmented coating step, the paint is sprayed from the nozzles in such a way that the number of the droplets of the paint sprayed per unit area of the coating object in the overlapping coating region is less than that in the normal coating region.

Other aspects of the present invention preferably further include in the segmented coating step, the coating is controlled by arranging a plurality of subdivided coating regions in the overlapping coating region and by placing the subdivided coating regions in the overlapping coating region formed in the previous scan adjacent to the subdivided coating regions in the overlapping coating region formed in the next scan.

Effects of Invention

In accordance with the present invention, there are provided a coater and a coating method for enhancing the coating quality by improving smoothness of a mixed part where the coating position in the previous scan overlaps the coating position in the next scan.

BRIEF DESCRIPTION OF THE DRAWINGS

FIG. 10 is a diagram illustrating an example of a dot size of the paint after halftone processing in the overlapping data region of the image data shown by FIG. 7;

FIG. 11 is a diagram illustrating an example of a dot size of the paint after halftone processing in the normal coating region of the image data shown by FIG. 7;

DETAILED DESCRIPTION OF EMBODIMENTS

A coater 10 and a coating method in accordance with one implementation of the present invention are explained below with reference to the drawings. It should be pointed out that the coater 10 and the coating method of this implementation are an ink-jet coater and a coating method for the same. Besides, the coater 10 and the coating method of this implementation "coat" the coating object like vehicle or vehicle parts to form a coating film of a specified thickness on the surfaces of the coating object for the purpose of surface protection and aesthetics.

[1. Coater Structure]

Figure 1:
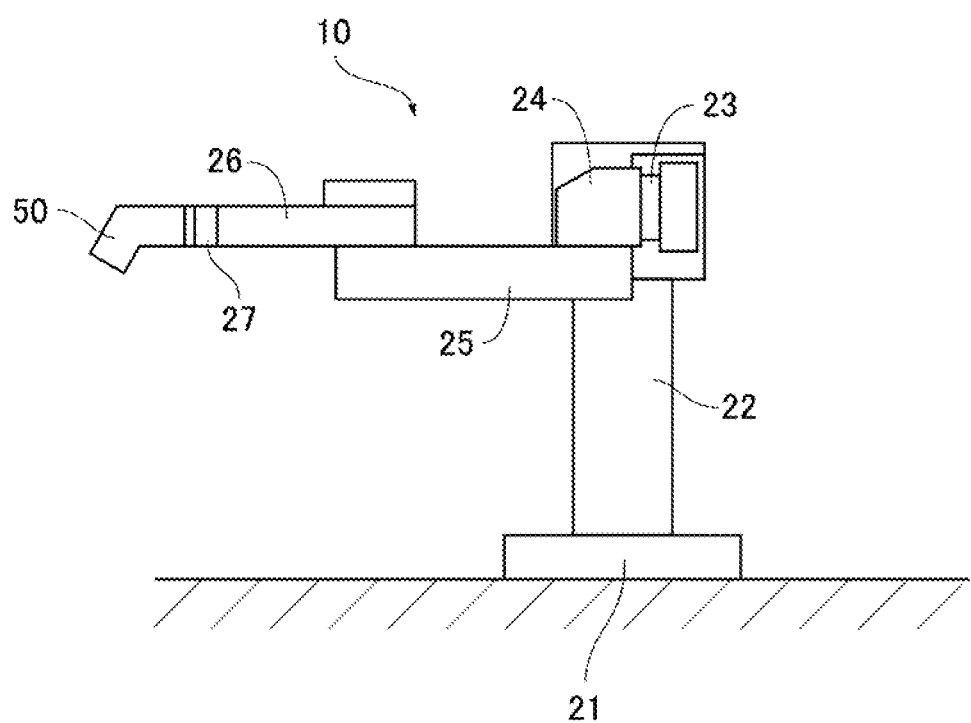
FIG. 1 is a schematic diagram of an overall structure of an ink-jet coater in accordance with a first implementation of the present invention.
Figure 2:
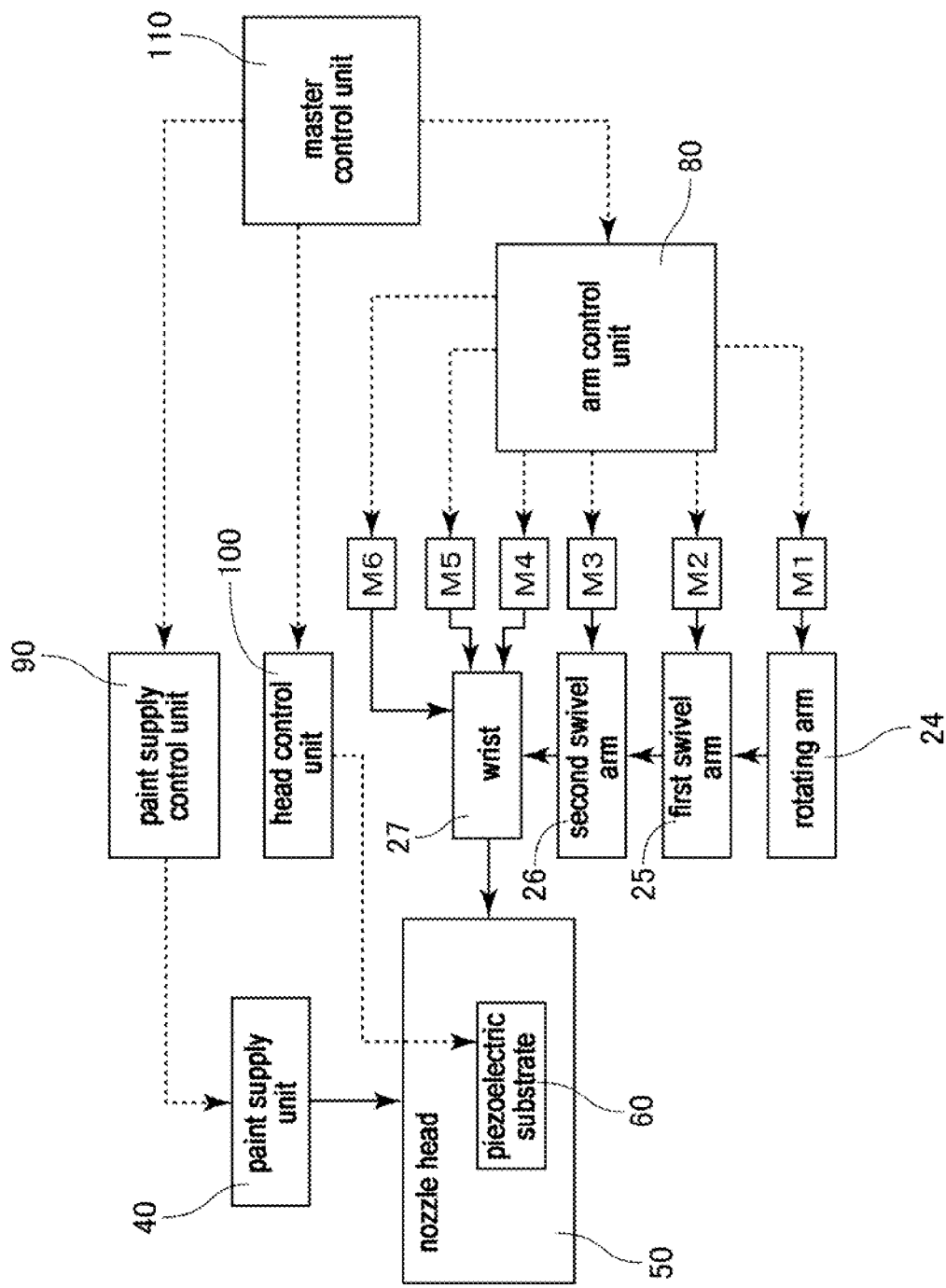
FIG. 2 is a diagram illustrating a schematic structure of the coater shown in FIG. 1.

FIG. 1 is a diagram illustrating a structure of the coater 10 in accordance with one implementation of the present invention and FIG. 2 is a diagram illustrating a schematic structure of the coater 10. As shown in FIGS. 1 and 2, the coater 10 includes a coating robot 20, a paint supply unit 40 and a head unit 50.

(1-1. Coating Robot)

The coating robot 20 is mainly comprised of a base 21, a leg 22, a rotating shaft 23, a rotating arm 24, a first swivel arm 25, a second swivel arm 26, a wrist 27 and motors M1-M6 for driving the above parts.

The base 21 is arranged on a mounting location, such as ground, but also can move relative to the mounting location. Besides, the leg 22 is set vertically upwards from the base 21. Moreover, a joint may also be disposed between the leg 22 and the base 21 to allow the leg 22 to rotate relative to the base 21.

In addition, an upper end of the leg 22 is provided with the rotating shaft 23. Further, the parts from the rotating shaft 23 to the wrist 27 correspond to a robot arm for moving the head unit 50.

The rotating arm 24 is mounted on the rotating shaft 23 in such a manner that the rotating arm 24 can rotate freely via the shaft. It should be pointed out that the rotating arm 24 can be driven by the motor M1 to rotate and the motor M1 may be an electric motor or a pneumatic motor. Moreover, the motor M1 may be disposed within a housing of the rotating arm 24, or may be arranged within a housing of the rotating shaft 23. The motor M1, when being an electric one, is preferably disposed within the housing of the rotating shaft 23 or the rotating arm 24 and internal pressure of the housing is increased to avoid explosion (which is the same for the respective motors M2-M6).

One end of the first swivel arm 25 is rotatably mounted on the rotating arm 24. Furthermore, the motor M2, which causes the first swivel arm 25 to rotate relative to the rotating shaft 23, may be received either within the housing of the rotating arm 24, or within the housing of the first swivel arm 25.

One end of the second swivel arm 26 is mounted on a further end of the first swivel arm 25 in such a manner that the second swivel arm may swing freely via a shaft. The motor M3, which causes the second swivel arm 26 to rotate relative to the first swivel arm 25, may be received either within the housing of the first swivel arm 25, or within the housing of the second swivel arm 26.

A further end of the second swivel arm 26 is provided with the wrist 27, which can rotate around a plurality of (e.g., three) shafts in different directions. Therefore, the direction of the nozzle head unit 50 can be controlled with high precision. Besides, the number of shafts can be any as long as it is more than two.

Motors M4-M6 are provided to implement rotating movement of the above wrist 27 around each of the shafts. In addition, the motors M4-M6 may be received within the housing of the second swivel arm 26, or at other positions.

The nozzle head unit 50 is mounted on the wrist 27 via a holder 30. In other words, the nozzle head unit 50 may be assembled to or disassembled from the wrist 27 freely via the holder 30.

The above coater 10, including the rotating shaft 23, the rotating arm 24, the first swivel arm 25, the second swivel arm 26, the wrist 27 and the motors M1-M6 for driving the above parts, is a robot driven by 6 shafts. However, the coater 10 may be a robot driven by more than four shafts.

(1-2. Paint Supply Unit)

As shown in FIG. 2, a paint supply unit 40 is provided in the coater 10. The paint supply unit 40 supplies the paint for the nozzle head unit 50 and includes supply lines, pumps and valves for supplying the paint. In addition, when the paint is supplied from the outside of the coating robot 20, a paint storage may be provided external to the coating robot 20 instead of being included therein.

(1-3. Nozzle Head Unit)

Figure 3:
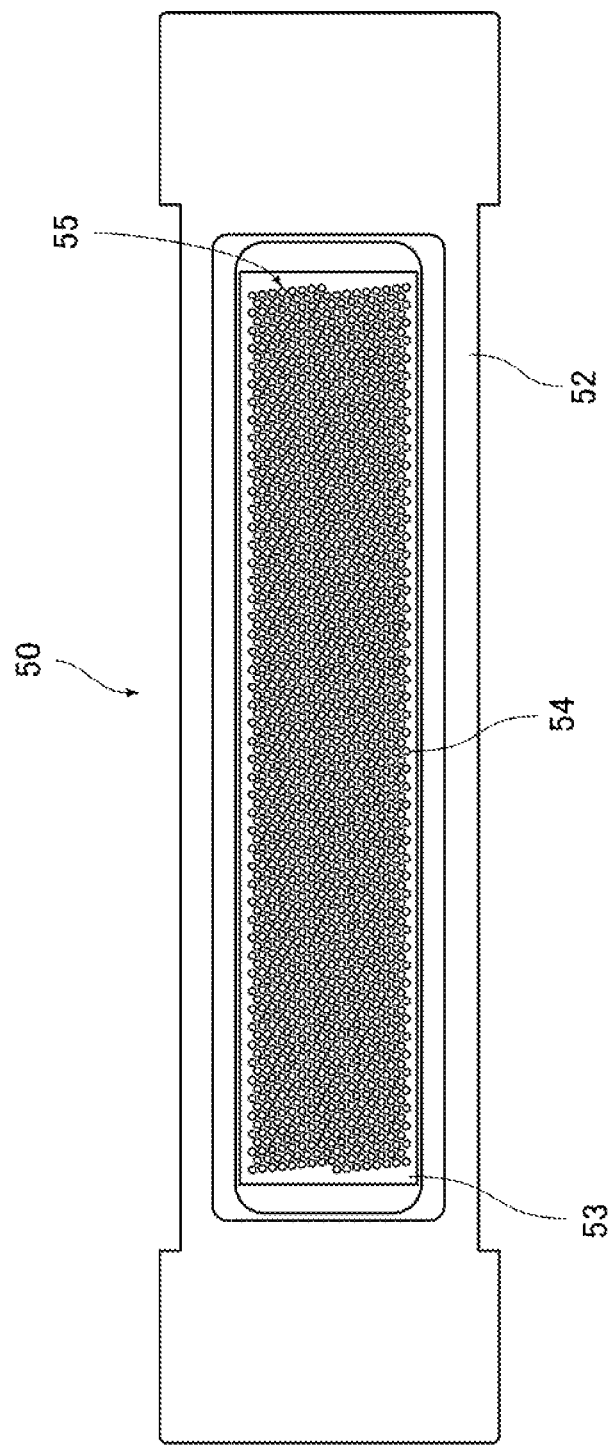
FIG. 3 is a diagram illustrating a state of a nozzle spray surface for spraying paint in the nozzle head unit of the coater shown in FIG. 1 when viewed from the front.
Figure 4:
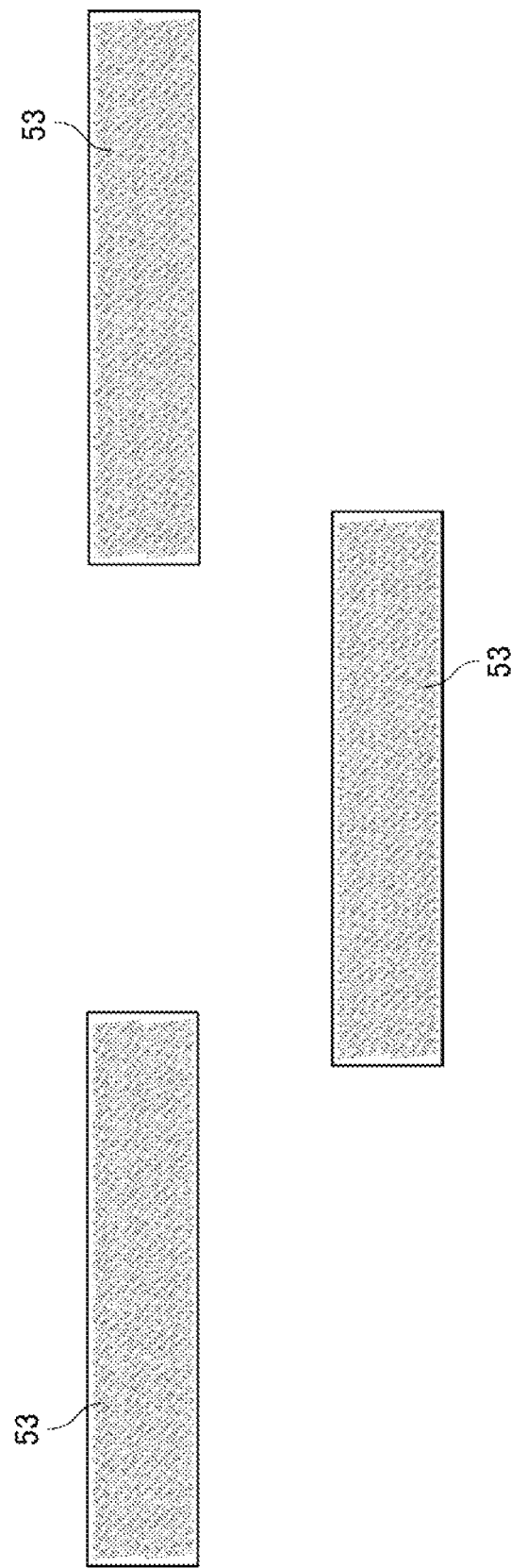
FIG. 4 is a diagram illustrating a state where the nozzle heads are staggered in FIG. 3.

The nozzle head unit 50 is illustrated next. The nozzle head unit 50 is mounted on the wrist 27 via the holder 30. FIG. 3 is a diagram illustrating a state of a nozzle spray surface 52 for spraying paint in the nozzle head unit 50 when viewed from the front. As shown, the nozzle spray surface 52 includes an individual nozzle head 53. However, the nozzle spray surface 52 also may be set as a head group comprised of a plurality of nozzle heads 53. In this case, the plurality of nozzle heads 53, for example, may be staggered as shown in FIG. 4, but the configuration of the nozzle heads 53 in the head group also may be non-staggered.

Figure 5:
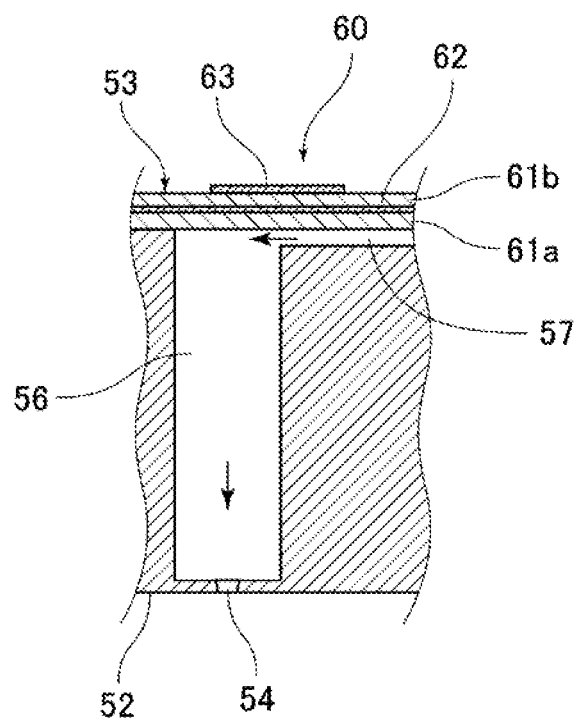
FIG. 5 is a section view of a schematic structure of the nozzle head shown in FIG. 3.

The nozzle head 53 is provided with a plurality of nozzles 54. Besides, a plurality of nozzle columns 55, in which the above nozzles 54 are connected along a specified direction, is provided on the nozzle head 53. FIG. 5 is a section view of a schematic structure of the nozzle head 53. As shown, a nozzle compression chamber 56 is arranged in the nozzle head 53 for each nozzle 54 and is connected to a paint supply path 57 used for supplying the paint. The nozzle compression chamber 56 is in communication with the nozzle 54 to spray the paint from each nozzle 54 by driving a piezoelectric substrate 60 described hereinafter to spray the paint.

As shown in FIG. 5, the piezoelectric substrate 60 is disposed at a top face (opposite to the nozzle 54) of the nozzle compression chamber 56. The piezoelectric substrate 60 includes two piezoelectric ceramic layers 61a and 61b as piezoelectrics, a common electrode 62 and an individual electrode 63. The piezoelectric ceramic layers 61a and 61b are scalable by applying voltage from the outside. The piezoelectric ceramic layers 61a and 61b may be made of ceramic materials like lead zirconate titanate (PZT) series, $NaNbO_3$ series, $BaTiO_3$ series, $(BiNa) NbO_3$ series and $BiNaNb_5O_{15}$ series with strong dielectricity.

As shown in FIG. 5, the common electrode 62 is disposed between the piezoelectric ceramic layers 61a and 61b. Besides, a surface electrode (not shown) for use by the common electrode is formed on the upper surface of the piezoelectric substrate 60. The common electrode 62 and the surface electrode for use by the common electrode are electrically connected by a penetrating conductor (not shown) in the piezoelectric ceramic layer 61a. Moreover, the individual electrode 63 is configured at a position opposite to the above nozzle compression chamber 56. A part of the piezoelectric ceramic layer 61a sandwiched by the common electrode 62 and the individual electrode 63 is polarized in a thickness direction. Therefore, when the voltage is applied to the individual electrode 63, the piezoelectric ceramic layer 61a deforms due to piezoelectric effect. When a specified drive signal is applied to the individual electrode 63, the piezoelectric ceramic layer 61b projects towards the nozzle compression chamber 56 to spray the paint.

Figure 6:
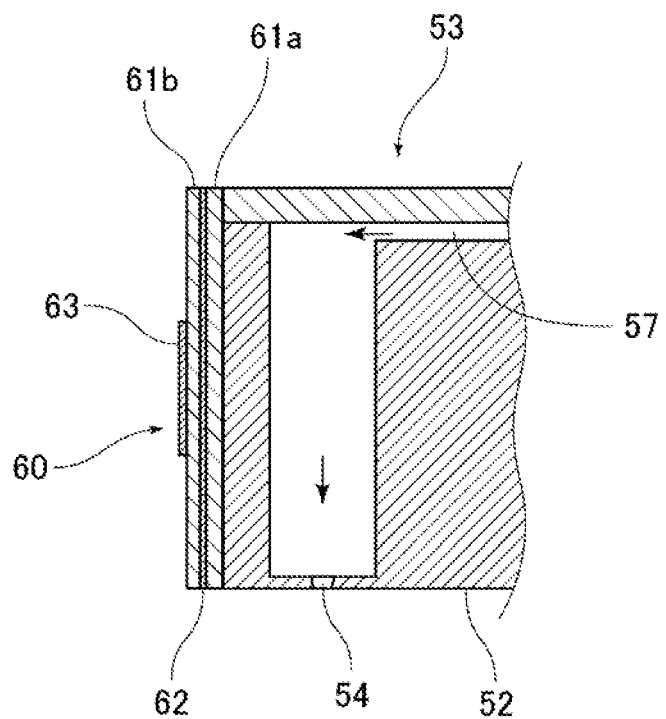
FIG. 6 is a section view of a variant of a schematic structure of the nozzle head shown in FIG. 5.

In addition, the common electrode 62 is not limited to the structure of being arranged at the top face of the nozzle compression chamber 56. For example, a structure of being disposed at a side face of the nozzle compression chamber 56 illustrated in FIG. 6 also can be adopted.

Furthermore, the piezoelectric substrate 60 of this implementation may change the applied driving voltage to vary the droplet size of the paint sprayed from the nozzle 54. To be specific, the piezoelectric substrate 60 can generate at least two sizes of droplets through changing the driving voltage. Sometimes, there are for example 7 droplet sizes generated. But it is also possible that only one size or more than two sizes are generated.

The piezoelectric substrate 60 corresponds to a nozzle driving mechanism. However, the nozzle driving mechanism also may correspond to components other than the piezoelectric substrate 60. For example, when the nozzle head 53 adopts other approaches aside from piezoelectric manner, a component driven for spraying the paint from the nozzle head 53 corresponds to the nozzle driving mechanism. For example, in a thermosensitive (air bubble) scenario, a heater for heating the paint in the nozzle compression chamber 56 corresponds to the nozzle driving mechanism. Additionally, in a valve-related case, a valve and a component driving the valve (solenoid etc.) correspond to the nozzle driving mechanism.

(1-4. Control Structure of Coater)

Then, the control structure of the coater 10 is illustrated below with reference to FIG. 2. As shown, the coater 10 includes an image processing unit 70, an arm control unit 80, a paint supply control unit 90, a head control unit 100 and a master control unit 110 and these components correspond to a coating control unit. However, it is also possible that at least one of the above components (e.g., the paint supply control unit 90) does not correspond to the coating control unit.

Moreover, various sensors which are omitted in the drawings are also included in the coater 10. Outputs from various sensors are input into some one of the arm control unit 80, the paint supply control unit 90, the head control unit 100 and the master control unit 110. The various sensors, for example, may include an accelerator sensor, an angular velocity sensor, a position detecting sensor for detecting positions of each drive part and an image sensor etc. Sensors except for the above listed ones also can be used.

The image processing unit 70 in the above control structure handles image data processing based on the size of the coating object, such as vehicle or vehicle parts, when the nozzle head 51 is in a state of spraying the paint. The image processing unit 70 for example corresponds to the computer, which may be a part of the coater 10 or arranged separately from the coater 10. When the image processing unit 70 is arranged separately from the coater 10, data are received and transmitted via wired or wireless communications between the image processing unit 70 and the coater 10. Besides, even if the image processing unit 70 is arranged separately from the coater 10, it may be included in the concept of the coater 10 or not.

Figure 7:
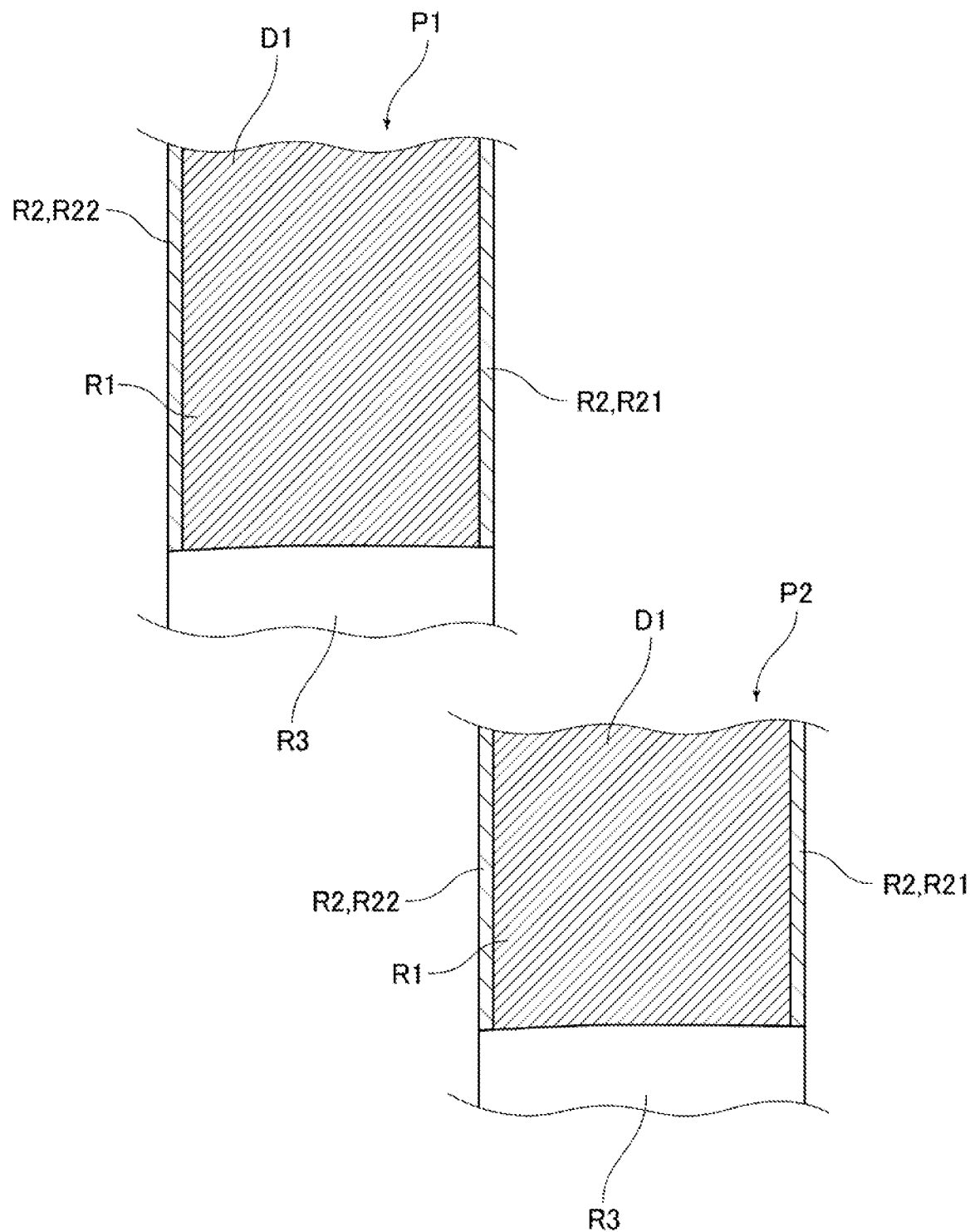
FIG. 7 is diagram illustrating images of image data resulted from spraying paint from the nozzle head of the coater shown in FIG. 1.

With respect to the above image data processing, the image processing unit 70 specifically produces image data D1 including a normal coating data region R1, an overlapping data region R2 and a non-spraying data region R3 as shown in FIG. 7 every time the nozzle head unit 50 scans the coating object (for each pass). In FIG. 7, two originally aligned image data D1 for a given pass P1 and its subsequent pass P2 are staggered for display to facilitate explanation.

The normal coating data region R1 is a partial region of the image data D1 for performing a normal coating on the coating object. The overlapping data region R2 is a partial region of the image data D1 for performing the coating such that the attached parts of the paint between neighboring passes overlap. The non-spraying data region R3 is a partial region of the image data D1 outside of the end of the coating object without the need of being sprayed with paint.

In the normal coating data region R1, a pixel value of each pixel for example is set to 0, such that the nozzle 54 sprays the ink to obtain an expected film thickness. It should be pointed out here that the pixel value 0 corresponds to spraying the paint in an expected film thickness. For example, in Black-White 256 Grayscale, the pixel value corresponds to 0 and the concentration is high in the case of black. However, this invention is not limited to this. For example, the maximum value obtained in the Grayscale also may correspond to spraying the paint in an expected film thickness. For example, the maximum pixel value 8 of 8 Grayscale, the maximum pixel value 16 of 16 Grayscale and the maximum pixel value 256 of 256 Grayscale may correspond to spraying the paint in an expected film thickness.

In addition, the maximum value or minimum value (0) in Grayscale for example also may correspond to spraying the paint in a thickness substantially greater than the expected film thickness. In this case, a desired pixel value (indicated as target pixel value below) between the maximum pixel value and the minimum pixel value of each pixel is defined as coating with an expected film thickness. Therefore, even if performed with the target pixel value, the coating also may be executed at the side of the nozzle head unit 50 with surplus capacity. Accordingly, for example, in accordance with the market where the vehicle is manufactured and sold, it is easy to perform the coating which is set to an appropriate thickness.

Furthermore, as clearly shown in FIG. 3, the nozzle columns 55 in the nozzle spray surface 52 are tilted with respect to the scanning direction (pass direction). Therefore, in the image processing unit 70, the respective nozzles 54 preferably spray the paint after reaching a spray starting position of the coating object and the normal coating data region R1 and the overlapping data region R2 are shifted in the scanning direction for each of the nozzles 54, so as to produce the image data D1.

The pixel values of the respective pixels are set to specified intermediate value in the overlapping data region R2 by the image processing unit 70. For example, when the two image data D1 of the adjacent passes include an overlapping data region (one-end overlapping data region) R21 and a further overlapping data region (other-end overlapping data region) R22 which overlap with each other, a pixel value corresponding to about half of the coating film thickness to be formed sometimes is set in the overlapping data region R21 and a pixel value corresponding to about half of the coating film thickness to be formed is also set in the further overlapping data region R22. Here, the one-end overlapping data region R21 in the previous pass and the other-end overlapping data region R22 in the subsequent pass overlap with each other.

However, the pixel value of the one-end overlapping data region R21 and the pixel value of the other-end overlapping data region R22 are respectively set, such that the coating film of the one-end overlapping data region R21 in the previous pass is formed thicker than that of the other-end overlapping data region R22 in the subsequent pass. Furthermore, the pixel value of the one-end overlapping data region R21 and the pixel value of the other-end overlapping data region R22 are respectively set, such that the coating film of the one-end overlapping data region R21 in the previous pass is formed thinner than that of the other-end overlapping data region R22 in the subsequent pass.

Besides, a pixel value (such as maximum pixel value) corresponding to not spraying the paint is set in the non-spraying data region R3. In order to reduce the coating time, the size of the image data D1 in the pass direction (operation direction) is preferably produced to minimize the area of the non-spraying data region R3 as much as possible.

It should be pointed out that the image data D1, at a position like an end side of the vehicle, only include either the one-end overlapping data region R21 or the other-end overlapping data region R22.

The arm control unit 80 is provided for controlling the driving of the above motors M1-M6. The arm control unit 80 includes a memory 81 which stores programs and data produced via robot teaching. Besides, in the arm control unit 80, the driving of the motors M1-M6 is controlled based on the programs and data stored in the memory 81 and the image processing in the image processing unit 70. Because of the above control, the nozzle head unit 50 can go through an expected position for executing the coating at a desired speed and stop at a specified position. The memory 81 also may be arranged inside the coater 10 or external to the coater 10 to receive and transmit the information via wired or wireless communications.

The paint supply control unit 90 controls paint supply to the nozzle head unit 50 and specifically controls operation of the pumps and values included in the paint supply unit 40. At this time, the paint supply control unit 90 controls the operation of the above pumps and values preferably by supplying the paint at a constant pressure (quantitative approach as an example) to the nozzle head unit 50. Besides, a head control unit 100 controls the operation of the piezoelectric substrate 60 in the nozzle head unit 50 based on the image processing of the image processing unit 70.

Moreover, the master control unit 100 transmits specified control signals to the above arm control unit 80, paint supply control unit 90 and head control unit 100 in such a way that the above motors M1-M6, the paint supply unit 40 and the piezoelectric substrate 60 cooperate to coat the coating object.

[2. Coating Method]

The method for coating the coating object like vehicle or vehicle parts with the coater 10 of the above structure is illustrated below.

Before coating, the image data D1 is produced on the basis of the measured sizes of the coating object, wherein the image data D1 is produced respectively for each pass of the scanning of the nozzle head unit 50. At this time, the produced image data D1 includes the normal coating data region R1, the overlapping data region R2 and the non-spraying data region R3 as mentioned above.

Afterwards, the master control unit 110 sends, based on the image data D1 produced by the image processing unit 70, control signals to the arm control unit 80, the paint supply control unit 90 and the head control unit 100 for executing the coating. In this way, the arm control unit 80 enables at least one of the motors M1-M6 to drive at a specified speed, so as to coat the coating object. Besides, when the paint supply control unit 90 detects, via the sensors not shown, that the nozzle head unit 50 reaches a specified position relative to the coating object, a given nozzle 54 of the nozzle head unit 50 starts to spray the paint.

Figure 8:
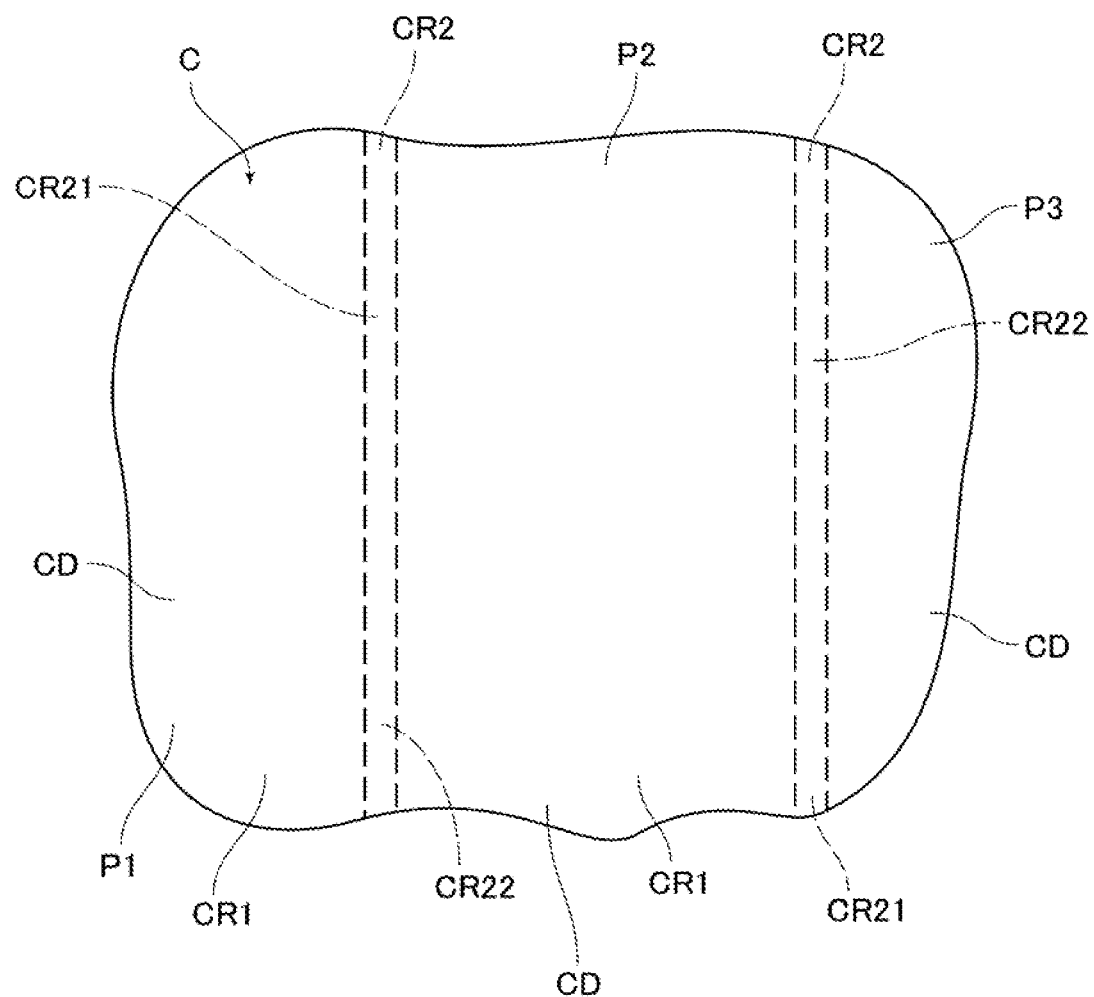
FIG. 8 is a diagram of a coating surface when the coating is executed by the coater shown in FIG. 1.

At this time, the head control unit 100 controls driving of the piezoelectric substrate 60 of the respective nozzles 54 by allowing the nozzles to sequentially spray the paint starting from the nozzle 54 arriving at the end of the coating object. Therefore, a coating surface C is formed on the coating object as shown in FIG. 8. This coating surface C is formed by scanning a plurality of segmented coating surfaces CD coated in each scanning (pass) and overlapping parts of the adjacent segmented coating surfaces CD.

In the above segmented coating surfaces CD, a normal coating region CR1 is formed by spraying the paint corresponding to the normal coating data region R1 and an overlapping coating region CR2 is formed by spraying the paint corresponding to the overlapping data region R2.

In this implementation, an one-end overlapping coating region CR21 of the segmented coating surface CD corresponding to the one-end overlapping region R21 and an other-end overlapping coating region CR22 of the segmented coating surface CD corresponding to the other-end overlapping coating region R22 in the previous pass P1 are mixed. As an example of the mixing, the one-end overlapping coating region CR21 may overlap the overlapping coating region CR2. Besides, the overlapping coating region CR2 is in a state of spraying less paint than the normal coating region CR1.

Figure 9:
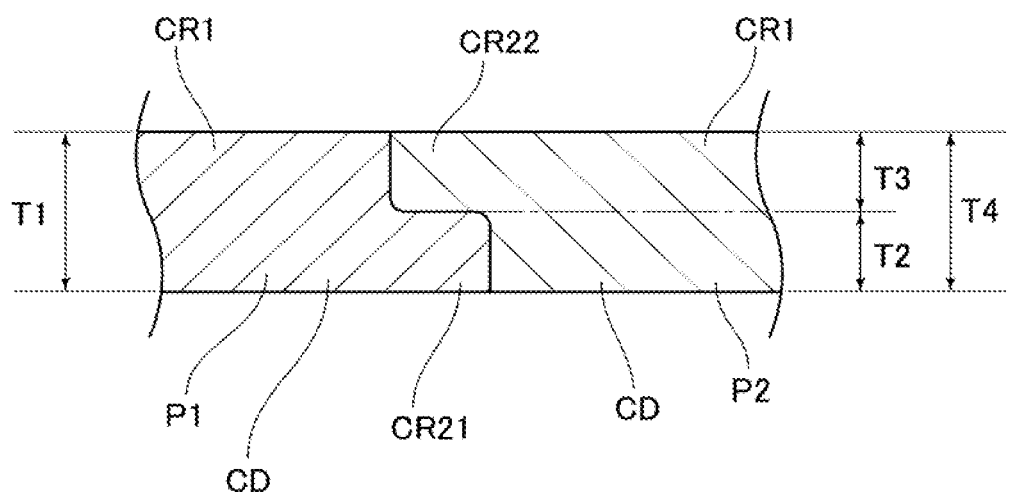
FIG. 9 is a section view of a normal coating region and an overlapping coating region in the coating surface shown by FIG. 8.

Here, representative structures of the normal coating region CR1 and the overlapping coating region CR2 are depicted in FIG. 9, which is a section view of an overlapping state between the one-end overlapping coating region CR21 and the other-end overlapping coating region CR22. As shown, an average thickness of the normal coating region CR1 is set to T1 in the previous pass P1 and the subsequent pass P2. By this time, a total thickness T4 of a thickness T2 of the one-end overlapping coating region CR21 and a thickness T3 of the other-end overlapping coating region CR22 overlapping with the one-end overlapping coating region CR21 is set to be equal to or substantially equal to the thickness T1.

Besides that the above one-end overlapping coating region CR21 overlaps with the other-end overlapping coating region CR22, the subdivided coating regions are adjoined in the following third coating control, which also corresponds to mixing. In the case where the coating regions after subdivision (subdivided coating regions) are adjoined, the thickness of the coating film of the respective subdivided coating regions is also equal to the above T1.

In order to form the one-end overlapping coating region CR21 and the other-end overlapping coating region CR22 in an overlapping or adjoining manner, the head control unit 100 controls the paint spray according to the following first coating control to the third coating control based on the image data D1.

(1) First Coating Control

The first coating control is performed in such a way that droplet size of the paint sprayed from the nozzle 54 in the one-end overlapping coating region CR21 and the other-end overlapping coating region CR22 is smaller than that in the normal coating region CR1.

In such case, the painting is executed in such a way that a sum of a volume of small-sized droplets sprayed in the one-end overlapping coating region CR21 and a volume of small-sized droplets sprayed in the other-end overlapping coating region CR22 equals to a volume of large-sized droplets sprayed in the normal coating region CR1.

The volume of a sphere usually is in direct proportion to the cube of the radius and the surface area of the sphere is directly proportional to the square of the radius. Therefore, as the radius becomes smaller, some components (organic solvent etc.) included in the paint droplet tend to disperse outwards. Furthermore, of solidified components constituting the coating film in the paint excluding the organic solvent, the total volume of the solidified components in the one-end overlapping coating region CR21 and the other-end overlapping coating region CR22 should be equal to the volume of the solidified components in the normal coating region CR1.

A time difference is present between the previous pass P1 and the subsequent pass P2. Therefore, to avoid tiny unevenness on the coating film caused by dispersion proportion of the organic solvent, a radius E1 of the droplet sprayed in the one-end overlapping coating region CR21 is greater than a radius E2 of the droplet sprayed in the other-end overlapping coating region CR22. In other words, the image data D1 of each pass also may be produced in the image processing unit 70 by arranging the one-end overlapping data region R21 corresponding to the radius E1 of the droplet in the previous pass P1 and arranging the other-end overlapping coating region CR22 corresponding to the radius E2 of the droplet in the subsequent pass P2.

Moreover, in the first coating control, the image data D1 of each pass are half-toned in the image processing unit 70 or the head control unit 100. At this time, the halftone processing may be performed by dithering or error diffusion. In addition, error diffusion, dithering and concentration patterning also can be used in the halftone processing.

Figures 10, 11:
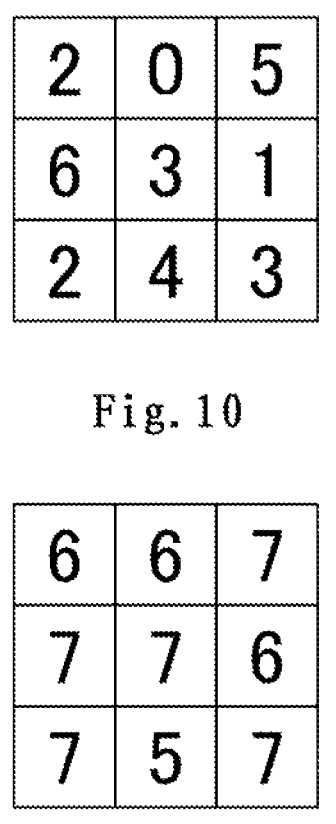

In the halftone processing, the paint droplet is converted into an optimal size (dot size) based on the pixel value of each pixel indicating Grayscale. At this time, it may be combined with ON and OFF of the dot. FIG. 10 is a diagram illustrating an example of the halftone processing in the overlapping data region R2. It should be pointed out that various numbers in the matrix of FIG. 10 represent the size of the paint droplet (dot) and the dot size gets bigger as the number increases. For example, when the dot size has 7 levels, a dot of a third size sorted in a descending order in an interested pixel is set to ON, a dot of a sixth size in a pixel adjacent to the interested pixel on the left is set to ON, a dot of a second size in a pixel to the left diagonal of the interested pixel is set to ON and a dot in a pixel above the interested pixel is set to OFF (0) as shown in FIG. 10, and so on. In this way, the dot size is determined for each pixel.

Besides, in the head control unit 100, the piezoelectric substrate 60 is driven, based on the image processing, to spray droplets from the nozzle 54 relative to the coating object. Therefore, the coating is performed with dot sizes dispersed especially in the overlapping data region R2. After the paint is applied to the coating object, the paint flows to the surroundings to form a coating film of the specified thickness.

Moreover, the dot size preferably is the maximum size or a value approximate to the maximum size in the normal coating data region R1 as shown in FIG. 11.

Here, in printing on paper or the like, even if the sprayed ink is half-toned, it is also impossible to form a specified thickness on the surface of the printing medium as the ink permeates the printing medium. Besides, in the case where the printing is performed on the printing medium like paper, since the printing relies on the whiteness of the printing medium, it is possible that certain positions cannot be sprayed with ink. However, the paint is formed with a film thickness (three-dimensional state) in the thickness direction in the coating procedure according to this implementation. Moreover, the paint will not permeate the coating object. Therefore, to avoid generating any non-coated regions in the above halftone processing for determining dot size, the image processing is performed preferably by arranging large-sized dots next to or around the small-sized dots.

When the paint is sprayed from the nozzle 54 through the above halftone processing, the normal coating region CR1 based on the normal coating data region R1 can form a coating film of the above thickness T1. In addition, the one-end overlapping coating region CR21 based on the one-end overlapping data region R21 can form a coating film of the above thickness T2 and the other-end overlapping coating region CR22 based on the other-end overlapping data region R22 can form a coating film of the above thickness T3.

(2) Second Coating Control

The droplets (dots) of the paint sprayed from the nozzle 54 are set to the same size in the second coating control to form the coating film. In this case, the expected film thickness is achieved by changing the number of dots sprayed into a certain region. For example, the number of dots sprayed from the nozzle 54 per unit area is changed by varying the frequency for driving the piezoelectric substrate 60. For another example, when the droplet (dot) size has 7 levels, the dot of a given size is sprayed to form the normal coating region CR1 and the overlapping coating region CR2. In addition, when the droplet (dot) size has 7 levels, the droplets (dots) of the third level or the fourth level size (sorted in an ascending order) may be sprayed for reducing the coating time and lowering complexity of the coating control.

Here, the number of dots sprayed per unit area of the coating object in the normal coating region CR1 on the basis of the normal coating data region R1 is set to D1. Moreover, the number of dots sprayed per unit area of the coating object in the overlapping data region R2 is set to D2. The normal coating region CR1 and the overlapping coating region CR2 are respectively formed by setting D1>D2.

The number of dots sprayed per unit area of the coating object in the one-end overlapping coating region CR21 is set to D21 while the number of dots sprayed per unit area of the coating object in the in the other-end overlapping coating region CR22 is set to D22. In this way, the number of dots per unit area of the coating object also may be determined by satisfying the Equation 1 below.

$$D1=D21+D22 \quad \text{(Equation 1)}$$

In such coating, even if the droplet size of the paint is identical, the thickness T2 of the coating film in the overlapping coating region CR21 and the thickness T3 of the coating film in the other-end overlapping coating region CR22 also may be smaller than the thickness T1 of the coating film in the normal coating region CR1. Accordingly, when the overlapping coating region CR21 overlaps the other-end overlapping coating region CR22, the coating film of a thickness identical to the thickness T1 in the normal coating region CR1 also can be formed in a three dimensional way.

(3) Third Coating Control

Figure 12:
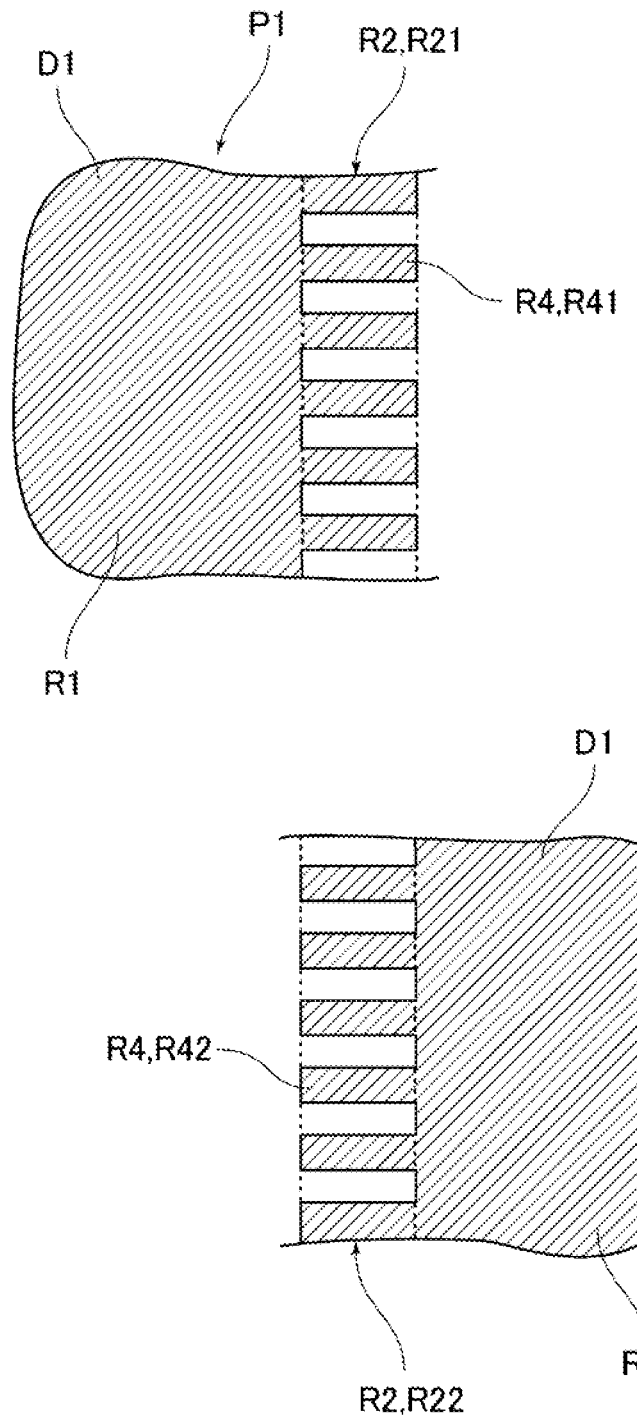
FIG. 12 is a diagram illustrating comb-like data region for one-end subdivision and data region for other-end subdivision within the overlapping data region of the image data shown by FIG. 7.
Figure 13:
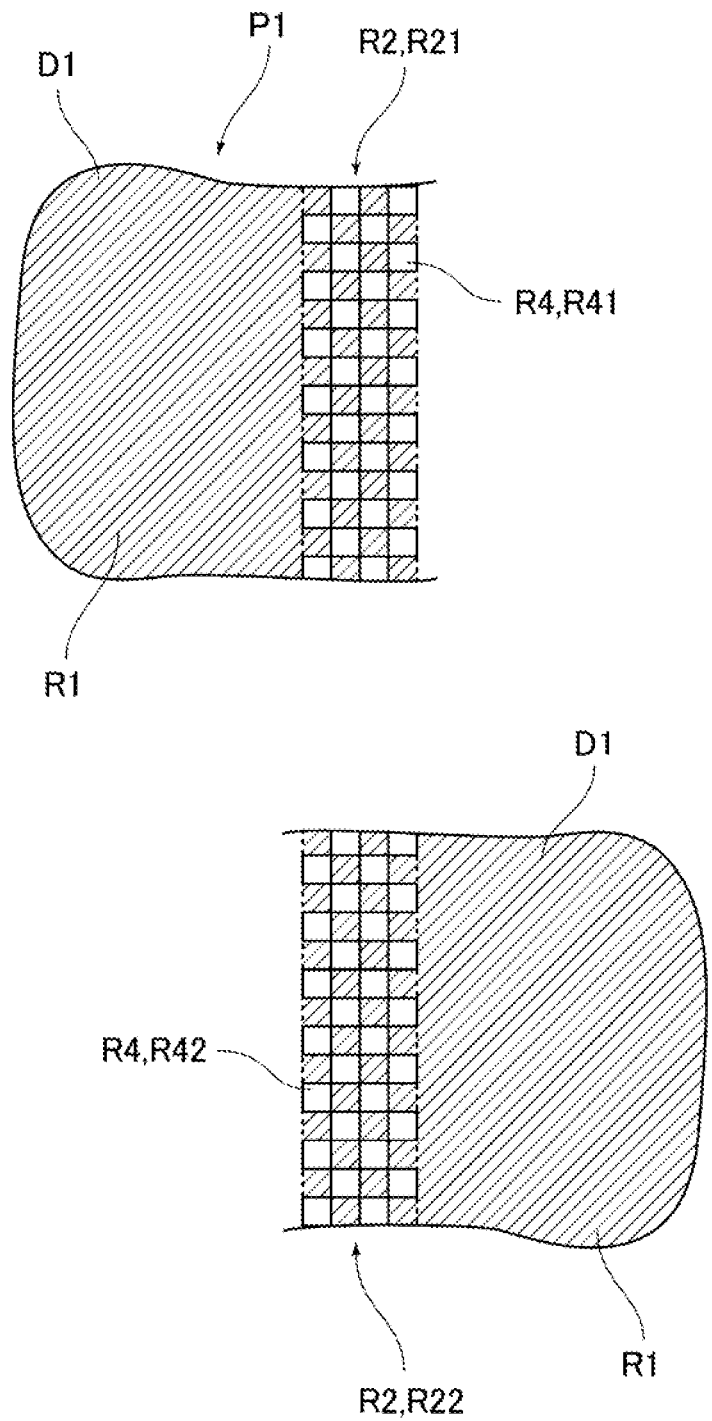
FIG. 13 is a diagram illustrating mesh-like data region for one-end subdivision and data region for other-end subdivision within the overlapping data region of the image data shown by FIG. 7.
Figure 14:
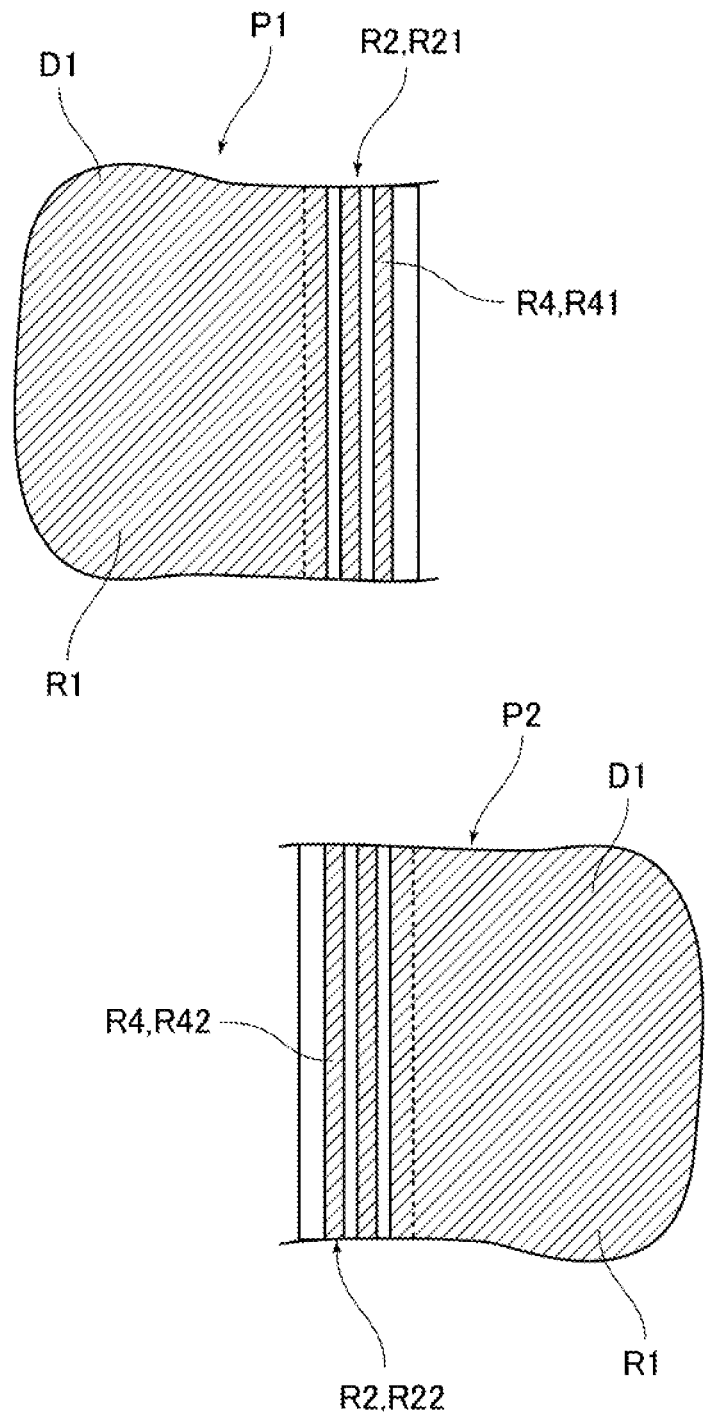
FIG. 14 is a diagram illustrating data region for one-end subdivision and data region for other-end subdivision in gradation form within the overlapping data region of the image data shown by FIG. 7.

Compared with the above first coating control and the second coating control, the area of the overlapping data region R2 (overlapping coating region CR2) is expanded in the third coating control. A data region R4 for subdivision shown in FIGS. 12-14 is produced by expanding the area. Specifically, a data region R41 for one-end subdivision is produced in one-end overlapping data region R21 of the previous pass P1 while a data region R42 for other-end subdivision is produced in the other-end overlapping coating region CR22 of the subsequent pass P2. Besides, the overlapping coating region CR2 of the uniform thickness can be formed by combining the data region R41 for one-end subdivision with the data region R42 for other-end subdivision.

Figure 15:
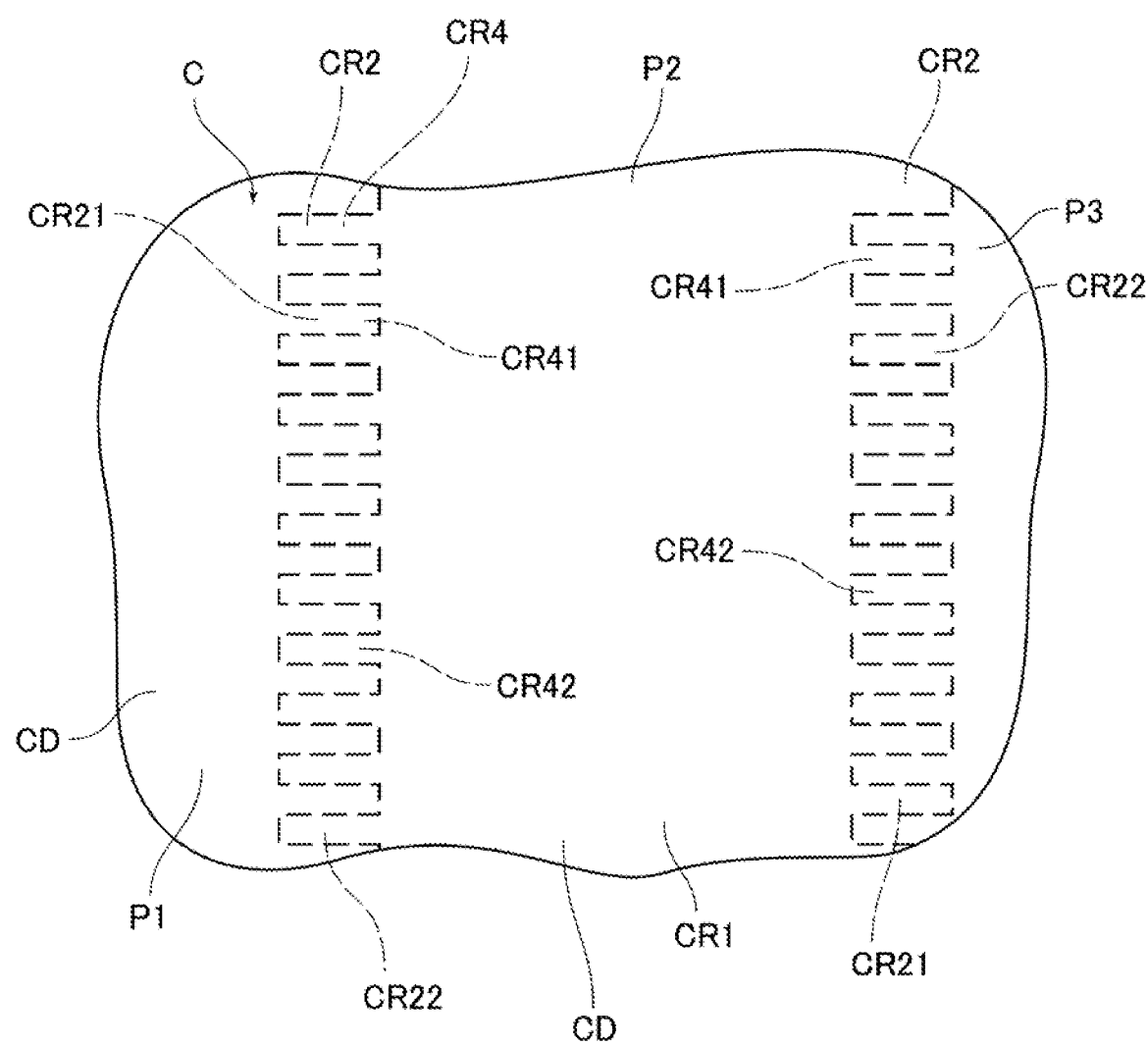
FIG. 15 is a diagram of a coating surface when the coating is executed based on the image data of FIG. 12.

Here, FIG. 12 a diagram illustrating a state where the data region R41 for one-end subdivision and the data region R42 for other-end subdivision are provided in a comb like shape. When the coating is executed based on the image data D1 shown in FIG. 12, it changes to the state shown in FIG. 15. As shown, the coating part corresponding to the data region R41 for one-end subdivision is an one-end subdivided coating region R41 and the coating part corresponding to the data region R42 for other-end subdivision is an other-end subdivided coating region CR42. Besides, the one-end subdivided coating region R41 and the other-end subdivided coating region CR42 are adjoined, rather than overlapping with each other in the thickness direction. Therefore, the one-end subdivided coating region CR41 and the other-end subdivided coating region CR42 are engaged with each other in a comb-like shape.

Figure 16:
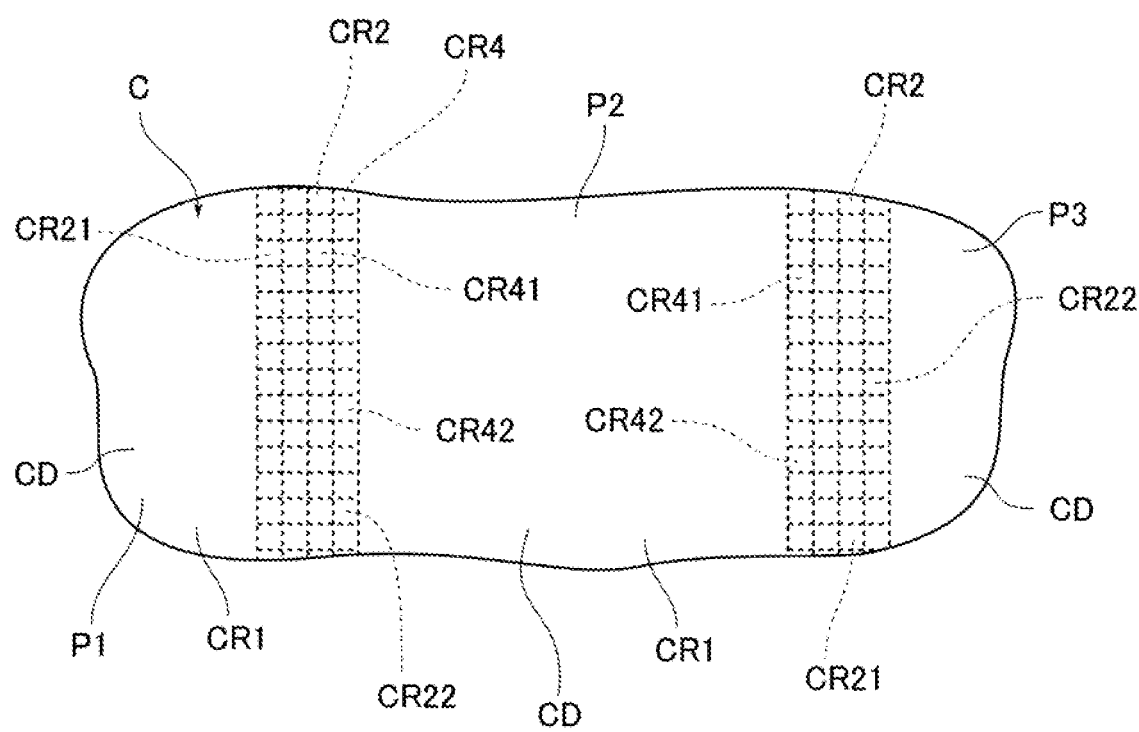
FIG. 16 is a diagram of a coating surface when the coating is executed based on the image data of FIG. 13.

FIG. 13 is a diagram illustrating a state where the data region R41 for one-end subdivision and the data region R42 for other-end subdivision are provided in a mesh shape. When the coating is executed based on the image data D1 in FIG. 13, it changes to the state shown by FIG. 16, in which the one-end subdivided coating region CR41 and the other-end subdivided coating region CR42 are configured in a checkered pattern, rather than overlapping with each other.

Figure 17:
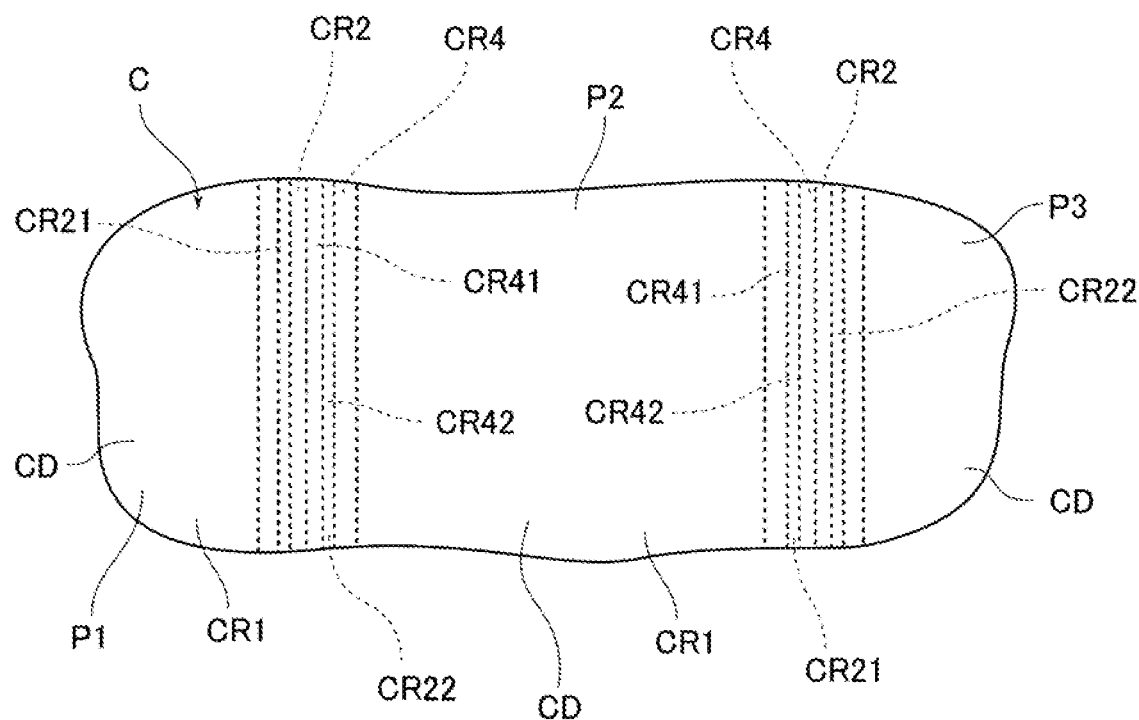
FIG. 17 is a diagram of a coating surface when the coating is executed based on the image data of FIG. 14.

FIG. 14 is a diagram illustrating a state where the data region R41 for one-end subdivision and the data region R42 for other-end subdivision are provided in a gradation form. When the coating is executed based on the image data D1 in FIG. 14, it changes to the state shown by FIG. 17, in which the one-end subdivided coating region CR41 and the other-end subdivided coating region CR42 respectively change to gradation patterns without overlapping with each other.

As described above, when the coating is performed on the coating object based on the image data D1 in which the data region R4 for subdivision exists in the overlapping data region R2, the respective subdivided coating regions CR4 have the thickness of T1. Therefore, the coating is performed with a uniform thickness of T1 in the overlapping coating region CR2.

The coating object is coated integrally by repeatedly scanning the nozzle head unit 50 with any one of the first coating control, the second coating control and the third coating control or combinations thereof and simultaneously spraying the paint from the nozzle 54 during the scanning.

[3. Effects]

In accordance with the coater 10 of the above structure and the coating method, the coating control unit (image processing unit 70, arm control unit 80, paint supply control unit 90, head control unit 100 and master control unit 110) controls the execution of the coating on the coating object by repeating scanning of the nozzle head unit for a plurality of times in a state of being divided into segmented coating surfaces CD formed by each scanning of the nozzle head unit 50. Besides, the coating control unit performs the coating by forming a normal coating region CR1 and an overlapping coating region CR2 in the segmented coating surfaces CD, wherein the coating is performed in the normal coating region CR1 so as to have a target coating film thickness T1, and the coating is performed in the overlapping coating region CR2 in a state where a spray amount of the paint is reduced compared to the normal coating region CR1. Moreover, the coating control unit mixes the overlapping coating region CR2 in the segmented coating surface CD to be coated in the next scan with the overlapping coating region CR2 in the segmented coating surface CD coated in the previous scan and takes the coating film thickness of the mixed overlapping coating region CR2 as the target coating film thickness to perform the coating.

Therefore, the thickness of the coating film in the overlapping coating region CR2 where the coating position (segmented coating surface CD) in the previous scan is mixed with the coating position (segmented coating surface CD) in the next scan can be set identical to the thickness of the normal coating region CR1. The coating over the entire coating surface C thus can be highly smoothed, which can prevent the bulge induced by the coating position (segmented coating surface CD) in the previous scan overlapping with the coating position (segmented coating surface CD) in the next scan from damaging smoothness.

Furthermore, in the overlapping coating control of this implementation, the driving of the piezoelectric substrate 60 (nozzle driving mechanism) and of the motors M1-M6 (arm driving mechanism) may also be controlled, to allow the overlapping coating region CR2 of the segmented coating surface CD to be coated in the next scan to overlap the overlapping coating region CR2 of the segmented coating surface CD coated in the previous scan in the thickness direction, thereby coating the target with coating film thickness.

In the above control situation, even if the overlapping coating regions CR2 in the previous and next scans overlap, this position is also coated to serve as the target coating film thickness T1, thereby coating the entire coating surface C at a high level of smoothness.

In the overlapping coating control of this implementation, the driving of the piezoelectric substrate 60 (nozzle driving mechanism) may also be controlled, such that the paint sprayed from the nozzle 54 in the overlapping coating region CR2 has a smaller droplet size than the paint sprayed in the normal coating region CR1.

In the above control situation, as the droplet of the paint sprayed from the nozzle 54 may be optimized to the minimum size, even if the overlapping coating regions CR2 in the previous and next scans overlap, this position is also coated to serve as the target coating film thickness T1, thereby coating the entire coating surface C at a high level of smoothness.

In the overlapping coating control of this implementation, the driving of the nozzle driving mechanism may also be controlled, such that the number of droplets of the paint sprayed per unit area of the coating object in the overlapping coating region CR2 is less than that in the normal coating region CR1.

In the above control situation, as the number of droplets (dots) sprayed from the nozzle 54 may be adjusted to an optimal number less than the normal coating region CR1, even if the overlapping coating regions CR2 in the previous and next scans overlap, this position is also coated to serve as the target coating film thickness T1, thereby coating the entire coating surface C at a high level of smoothness. In addition, since the paint is sprayed from the nozzle 54 with the same droplet size, the thickness of the coating film can be calculated proportionally and therefore be easily controlled.

In the overlapping coating control of this implementation, the coating may also be controlled by arranging a plurality of subdivided coating regions CR4 in the overlapping coating region CR2 and by placing the subdivided coating region CR4 in the overlapping coating region CR2 formed in the previous scan adjacent to the subdivided coating region CR4 in the overlapping coating region CR2 formed in the next scan.

In the above control situation, the subdivided coating region CR4 formed in the previous scan and the subdivided coating region CR4 formed in the next scan are adjoined, rather than overlapping with each other. Therefore, the amount of paint sprayed from the nozzle 54 is adjusted to perform the coating with the coating film thickness T1 as the target in the overlapping coating region CR2, thereby coating the entire coating surface C at a high level of smoothness.

[4. Variants]

One implementation of the present invention has been described above, but the present invention is not limited to this and may include different variations, which are explained below.

In the above implementation, the thickness T2 of the one-end overlapping coating region CR21 for example has a substantially the same thickness in its width direction and the thickness T3 of the other-end overlapping coating region CR22 also has a substantially the same thickness in its width direction. However, the thickness of the one-end overlapping coating region CR21 and the other-end overlapping coating region CR22 may also be non-uniform.

Figure 18:
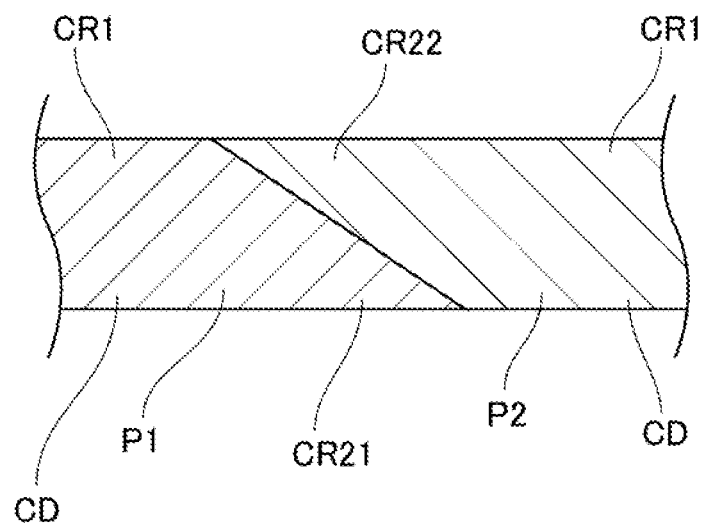
FIG. 18 is a section view of a normal coating region and an overlapping coating region in the coating surface according to a variant of the present invention.

For example, the coating is performed in such a way that the thickness gradually decreases with an increase of distance from the normal coating region CR1 in the one-end overlapping coating region CR21 of the previous pass P1 as shown in FIG. 18. Meanwhile, the coating is also performed in such a way that the thickness gradually decreases with an increase of distance from the normal coating region CR1 in the other-end overlapping coating region CR22 of the subsequent pass P2. At this time, in the coating control of the one-end overlapping coating region CR21 and the other-end overlapping coating region CR22, the coating is executed for example using the method of changing dot size in the above first coating control, wherein the dot size decreases with an increase of distance from the respective normal coating regions CR1. Moreover, in the coating control of the one-end overlapping coating region CR21 and the other-end overlapping coating region CR22, the coating is executed using the method of changing the number of droplets (dots) sprayed per unit area in the above second coating control, wherein the number of droplets (dots) sprayed decreases with an increase of distance from the respective normal coating regions CR1.

In the case of the above coating control, as the nozzle 54 sprays small-sized droplets (dots) of the paint at a side close to the normal coating region CR1, the seams between the segmented coating surfaces CD (between passes) can hardly be identified.

Figure 19:
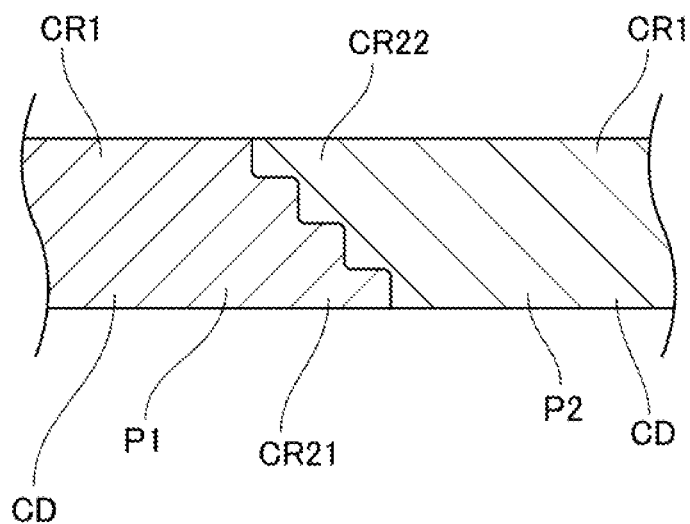
FIG. 19 a section view of a normal coating region and an overlapping coating region in the coating surface according to a further variant of the present invention.

Furthermore, the coating is performed in such a way that the thickness decreases periodically with an increase of distance from the normal coating region CR1 in the one-end overlapping coating region CR21 of the previous pass P1 as shown in FIG. 19. Meanwhile, the coating is also performed in such a way that the thickness decreases periodically with an increase of distance from the normal coating region CR1 in the other-end overlapping coating region CR22 of the subsequent pass P2. In this case, the periodical change of the thickness in FIG. 19 also can be implemented using the method of changing dot size in the above first coating control and/or the method of changing the number of droplets (dots) in the second coating control as depicted in the above with reference to FIG. 18.

In the above FIGS. 18 and 19, a part, especially a thin one, in the other-end overlapping coating region CR22 of the subsequent pass P2 overlaps with a thick part in the one-end overlapping coating region CR21 of the previous pass P1 to correct the thickness.

Besides, the above implementation also explains the case of forming the coating film of constant thickness. However, the coater 10 and the coating method of the present invention are not limited to forming the coating film of constant thickness. For example, when the coating object is depicted according to a certain design, the coater 10 and the coating method of the present invention are also applicable.

Here, the thickness of the coating film as depicted sometimes changes according to the coating position. Even in this case, there is a target coating film thickness for each position. Therefore, the overlapping coating region in the segmented coating surface to be coated in the next scan is mixed with the overlapping coating region in the segmented coating surface coated in the previous scan. The coating film thickness of the mixed overlapping coating region can act as the target coating film thickness to coat each position.

In the above implementation, the first, second and third coating control are explained for the overlapping coating region. However, at least two of the first, second and third coating control also may be combined for execution. For example, the coating may be executed by changing the dot size like the first coating control and changing the number of dots sprayed per unit area like the second coating control simultaneously. In addition, the coating may also be executed by changing the dot size like the first coating control and forming the subdivided coating region like the third coating control simultaneously. Furthermore, the coating may also be executed by changing the number of dots sprayed per unit area like the second coating control and forming the subdivided coating region like the third coating control simultaneously.

DESCRIPTION OF REFERENCE SIGNS

10: coater; 20: coating robot; 21: base; 22: leg; 23: rotating shaft; 24: rotating arm; 25: first swivel arm; 26: second swivel arm; 27: wrist; 30: holder; 40: paint supply unit; 50: nozzle head unit; 51: head cover; 52: nozzle spray surface; 53: nozzle head; 54: nozzle; 55: nozzle column; 56: nozzle compression chamber; 57: paint supply path; 60: piezoelectric substrate; 61a, 61b: piezoelectric ceramic layer; 62: common electrode; 63: individual electrode; 70: image processing unit; 80: arm control unit; 81: memory; 90: paint supply control unit; 100: head control unit; 110: master control unit; C: coating surface; CD: segmented coating surface; CR1: normal coating region; CR2: overlapping coating region; CR21: one-end overlapping coating region; CR22: other-end overlapping coating region; CR4: subdivided coating region; CR41: one-end subdivided coating region; CR42: other-end subdivided coating region; D1: image data; M1-M6: motor; R1: normal coating data region; R2: overlapping data region; R21: one-end overlapping data region; R22: other-end overlapping data region; R3: non-spraying data region; R4: data region for subdivision; R41: data region for one-end subdivision; R42: data region for other-end subdivision.

I claim:

1. An ink-jet coater for coating a coating object by spraying a paint from a nozzle in an inkjet fashion, the ink-jet coater comprising:
   a nozzle head unit having a nozzle head formed with a plurality of nozzles at a nozzle spray surface and a nozzle driving mechanism causing the paint to be sprayed from the plurality of nozzles;
   a robot having a plurality of arms capable of relatively rotating via shafts and an arm driving mechanism for moving the plurality of arms, and configured to move the nozzle head unit in a state of holding the nozzle head unit through driving of the arm driving mechanism; and
   a coating control unit configured to control driving of the nozzle driving mechanism and driving of the arm driving mechanism to execute coating on the coating object;
   wherein the coating control unit controls execution of the coating on the coating object by repeating scanning of the nozzle head unit for a plurality of times in a state of being divided into segmented coating surfaces formed by each scanning of the nozzle head unit; and
   wherein the coating control unit performs the coating by forming a normal coating region and an overlapping coating region in each of the segmented coating surfaces, wherein in the normal coating region the coating is performed so as to have a target coating film thickness, and in the overlapping coating region a spray amount of the paint is applied to separate spaced apart portions of the overlapping coating region compared to the normal coating region; and
   wherein the coating control unit performs an overlapping coating control by applying in a next scan a spray amount of the paint to portions of the overlapping coating region adjoining the separate spaced apart portions of the overlapping coating region in the segmented coating surface coated in a previous scan and wherein in the normal coating region the coating is performed so as to have a target coating film thickness, and in the overlapping coating region a spray amount of the paint is applied to the separate spaced apart portions of the overlapping coating region sufficient to achieve the target coating film thickness.

2. The ink-jet coater of claim 1, wherein in the overlapping coating control, the driving of the nozzle driving mechanism and the driving of the arm driving mechanism are controlled to perform coating such that the overlapping coating region of the segmented coating surface to be coated in the next scan overlaps the overlapping coating region of the segmented coating surface coated in the previous scan in a thickness direction, thereby becoming the target coating film thickness.

3. The ink-jet coater of claim 1, wherein in the overlapping coating control, the coating is controlled by arranging a plurality of subdivided coating regions in the overlapping coating region and by placing the subdivided coating regions in the overlapping coating region formed in the previous scan adjacent to the subdivided coating regions in the overlapping coating region formed in the next scan.

4. The ink-jet coater of claim 1 wherein the coating control unit is configured to arrange the separate spaced apart portions side by side.

5. The ink-jet coater of claim 1 wherein the coating control unit is configured to arrange the separate spaced apart portions in a checkerboard fashion along an edge of the normal coating region.

6. The ink-jet coater of claim 1 wherein the separate spaced apart portions extend parallel to an edge of the normal coating region.

7. The ink-jet coater of claim 1 wherein the spray amount in the next scan applies sufficient paint to the portions of the overlapping coating region adjoining the separate spaced apart portions to achieve the target coating film thickness.

8. The ink-jet coater of claim 7 wherein the coating control unit is configured to arrange the separate spaced apart portions in a checkerboard fashion along an edge of the normal coating region of a previous scan.

9. The ink-jet coater of claim 1 wherein the separate spaced apart portions extend at a right angle to an edge of the normal coating region.

* * * * *